US010455400B2

United States Patent
Patil et al.

(10) Patent No.: US 10,455,400 B2
(45) Date of Patent: Oct. 22, 2019

(54) PEER DISCOVERY IN NEIGHBOR AWARENESS NETWORKING (NAN) AIDED DATA LINK NETWORKS

(71) Applicant: QUALCOMM Incorporated, San Diego, CA (US)

(72) Inventors: Abhishek Pramod Patil, San Diego, CA (US); Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/629,892

(22) Filed: Feb. 24, 2015

(65) Prior Publication Data

US 2015/0350866 A1  Dec. 3, 2015

Related U.S. Application Data

(60) Provisional application No. 62/006,813, filed on Jun. 2, 2014.

(51) Int. Cl.
    *H04J 3/06* (2006.01)
    *H04W 8/00* (2009.01)
    (Continued)

(52) U.S. Cl.
    CPC ......... *H04W 8/005* (2013.01); *H04W 40/244* (2013.01); *H04W 80/02* (2013.01); *H04W 84/12* (2013.01); *H04W 84/18* (2013.01)

(58) Field of Classification Search
    USPC ....... 370/229, 230, 236, 252, 310, 324, 350, 370/503
    See application file for complete search history.

(56) References Cited

U.S. PATENT DOCUMENTS 7,522,540 B1   4/2009  Maufer
7,814,322 B2  10/2010  Gurevich et al.
(Continued)

FOREIGN PATENT DOCUMENTS

CN   102067560 A   5/2011
CN   102461314 A   5/2012
(Continued)

OTHER PUBLICATIONS

Hiertz G.R., et al., "IEEE 802.11s: The WLAN Mesh Standard", IEEE Wireless Communications, IEEE Service Center, Piscataway, NJ, US, vol. 17, No. 1, Feb. 1, 2010 (Feb. 1, 2010), pp. 104-111, XP011303163, ISSN: 1536-1284.
(Continued)

*Primary Examiner* — Kwang B Yao
*Assistant Examiner* — Nguyen H Ngo
(74) *Attorney, Agent, or Firm* — Arent Fox, LLP and Qualcomm, Incorporated

(57) ABSTRACT

A method, an apparatus, and a computer program product for wireless communication are provided. In one aspect, a first station discovers a second station capable of providing a service of interest to the first station. The second station is one of a plurality of stations participating in a NAN data link network that provides the service of interest and supports communication over a NAN data link channel without beaconing. The second station is discovered through communication over a NAN channel supported by a plurality of neighborhood stations forming a NAN network. The NAN channel has a beaconing operation that provides synchronization. After discovery of the second station, the first station communicates with the second station over the NAN data link channel, to obtain data corresponding to the service of interest.

32 Claims, 11 Drawing Sheets

(51) Int. Cl.
*H04W 40/24* (2009.01)
*H04W 80/02* (2009.01)
*H04W 84/12* (2009.01)
*H04W 84/18* (2009.01)

(56) References Cited

U.S. PATENT DOCUMENTS

| | | | |
|---|---|---|---|
| 7,898,983 B2 | 3/2011 | Laroia et al. | |
| 8,385,316 B2 | 2/2013 | Laroia et al. | |
| 8,493,887 B2 | 7/2013 | Palanki et al. | |
| 8,599,823 B2 | 12/2013 | Laroia et al. | |
| 2007/0141984 A1* | 6/2007 | Kuehnel | H04W 4/008 455/41.2 |
| 2008/0031210 A1* | 2/2008 | Abhishek | H04W 8/005 370/338 |
| 2009/0010244 A1* | 1/2009 | Laroia | H04L 5/0007 370/350 |
| 2009/0013081 A1* | 1/2009 | Laroia | H04W 8/005 709/228 |
| 2009/0019168 A1* | 1/2009 | Wu | H04L 5/0048 709/228 |
| 2009/0319663 A1* | 12/2009 | Giles | H04W 8/183 709/226 |
| 2010/0271959 A1* | 10/2010 | Qi | H04L 41/12 370/248 |
| 2011/0047289 A1 | 2/2011 | Venkatachalam et al. | |
| 2013/0155900 A1 | 6/2013 | Sampath et al. | |
| 2013/0208620 A1 | 8/2013 | Kaufman et al. | |
| 2013/0322297 A1* | 12/2013 | Dominguez | H04W 4/21 370/255 |
| 2014/0080481 A1* | 3/2014 | Abraham | H04W 8/005 455/434 |
| 2014/0254566 A1* | 9/2014 | Qi | H04W 56/00 370/336 |
| 2014/0269670 A1* | 9/2014 | Park | H04W 56/00 370/350 |
| 2014/0362726 A1* | 12/2014 | Vandwalle | H04W 84/18 370/254 |
| 2015/0071121 A1* | 3/2015 | Patil | H04W 40/24 370/255 |
| 2015/0109961 A1* | 4/2015 | Patil | H04W 4/206 370/254 |
| 2015/0163828 A1* | 6/2015 | Vandwalle | H04W 28/044 370/330 |
| 2015/0264514 A1* | 9/2015 | Qi | H04W 4/70 370/338 |
| 2015/0319235 A1* | 11/2015 | Liu | H04W 72/0446 709/204 |
| 2015/0319675 A1* | 11/2015 | Park | H04W 48/16 370/338 |
| 2015/0319695 A1* | 11/2015 | Huang | H04W 4/008 370/311 |
| 2015/0341811 A1* | 11/2015 | Deshpande | H04W 24/02 370/252 |
| 2015/0351114 A1* | 12/2015 | Wolf | H04L 67/1085 370/330 |
| 2016/0014831 A1* | 1/2016 | Lee | H04W 76/023 370/329 |
| 2016/0037483 A1* | 2/2016 | Du | H04W 4/06 370/252 |

FOREIGN PATENT DOCUMENTS

| | | |
|---|---|---|
| KR | 20110036057 A | 4/2011 |
| KR | 20120010259 A | 2/2012 |
| WO | 2009006166 A1 | 1/2009 |
| WO | 2009009310 A2 | 1/2009 |
| WO | 2009009314 A1 | 1/2009 |
| WO | 2010078271 A2 | 7/2010 |
| WO | 2014035604 A1 | 3/2014 |

OTHER PUBLICATIONS

International Search Report and Written Opinion—PCT/US2015/027106—ISA/EPO —dated Jul. 23, 2015.

* cited by examiner

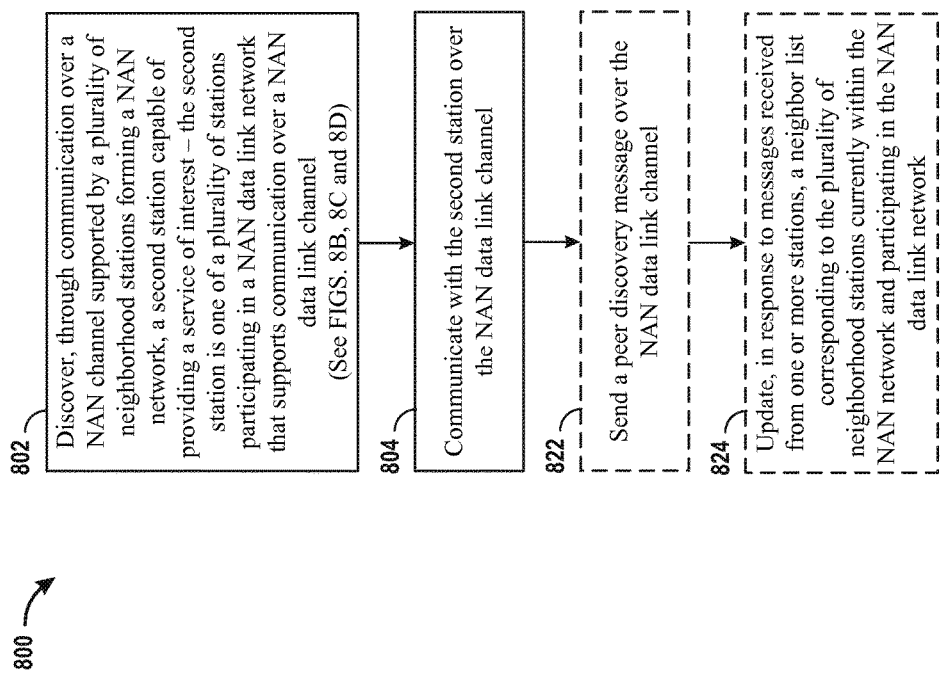

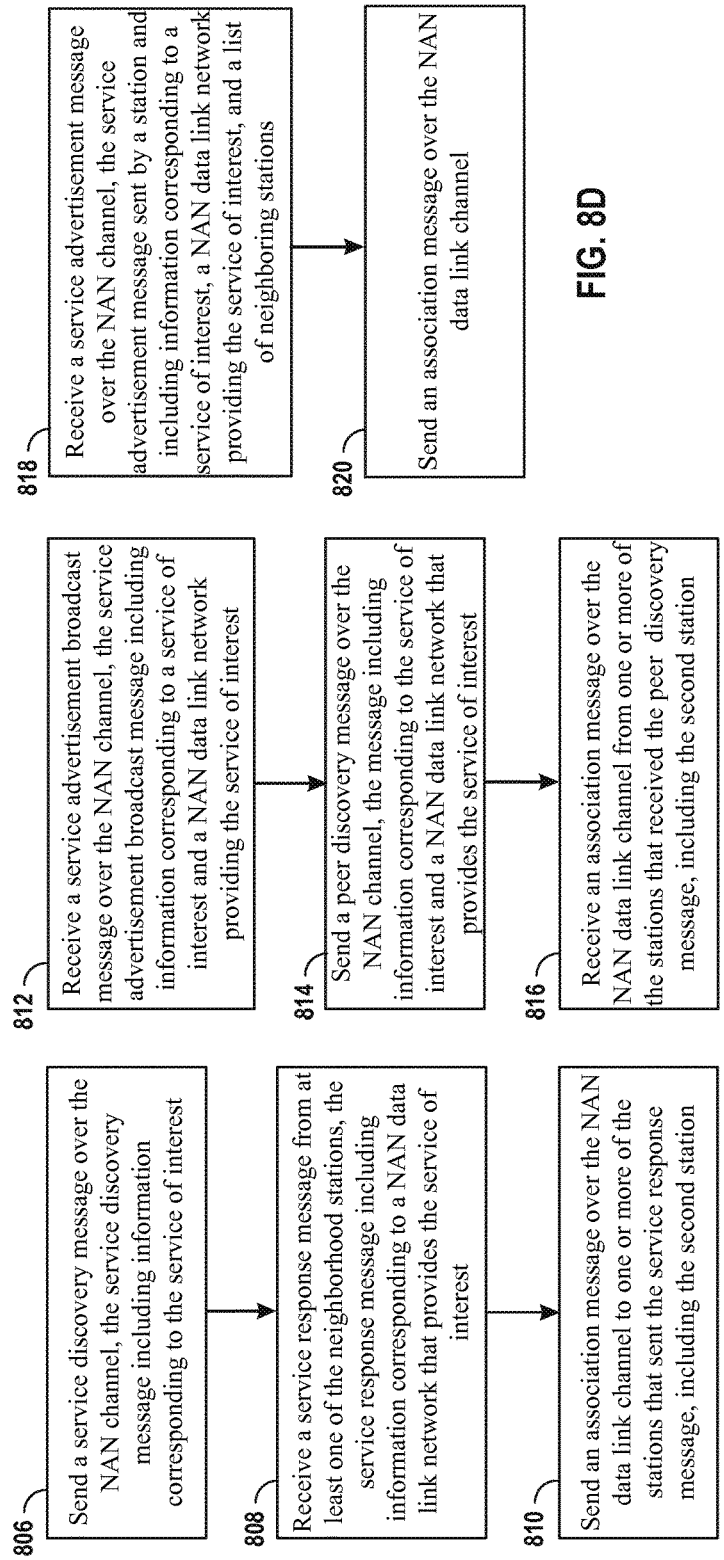

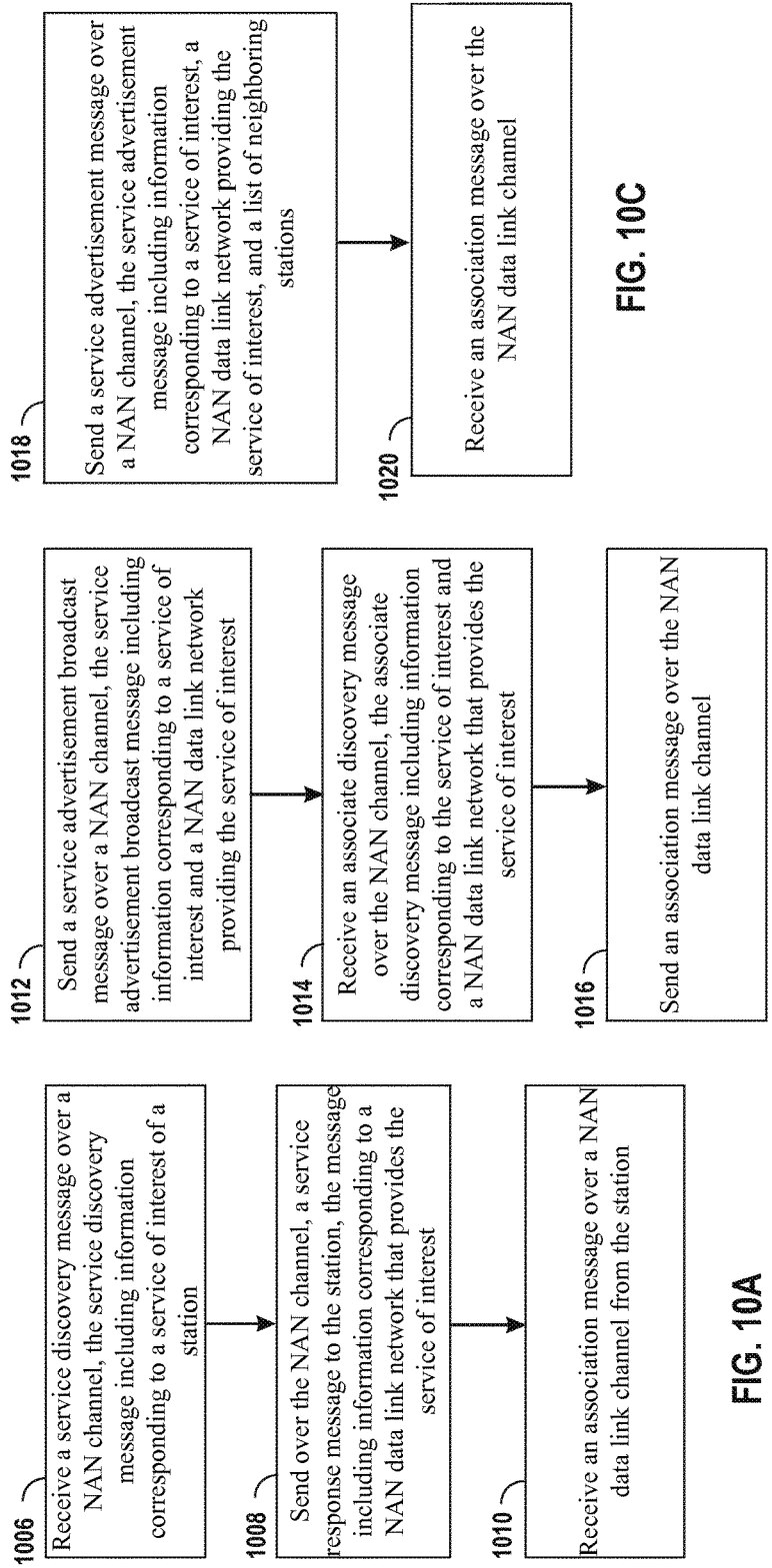

PEER DISCOVERY IN NEIGHBOR AWARENESS NETWORKING (NAN) AIDED DATA LINK NETWORKS

CROSS-REFERENCE TO RELATED APPLICATION(S)

This application claims the benefit of U.S. Provisional Application Ser. No. 62/006,813, entitled "Peer Discovery In Social Wi-Fi Networks" and filed on Jun. 2, 2014, which is expressly incorporated by reference herein in its entirety.

BACKGROUND

Field

The present disclosure relates generally to communication systems, and more particularly, to discovery and post-discovery communications by devices in neighbor awareness networking (NAN) networks.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

In the foregoing networks, devices typically form a network and then discover the capabilities of other devices within the network. Neighborhood awareness networking is another networking approach, wherein devices advertise services that they may provide and/or discover the services of nearby devices. A neighbor awareness networking (NAN) network provides beaconing, synchronization, and small advertisement and subscription frames that allow devices to advertise services and discover services. The main purpose of a NAN network is to aid service discovery within a one-hop range of a discovering device. NAN network specifications, however, focus on service discovery and provide little information on post-discovery processes by which a discovering device may access a service of interest. NAN network specifications, for example, provide for connection attributes that allow a provider device that can provide a service to inform a seeking device interested in that service, of the access point to which the provider device is connected. The seeking device may then connect to the access point to receive the service or alternatively, go a Wi-Fi direct route, whereby one of the provider device and seeking device becomes a group owner and the seeking device connects with the provider device to receive the service of interest. The foregoing options of receiving a service of interest through a NAN network depend on network infrastructure, such as an access point, which in turn depends on cellular service, or formation of a group within a Wi-Fi direct setting. NAN networks may also be referred to as social Wi-Fi networks A NAN data link network is a network of devices or stations that typically supports one or more services or applications, e.g., music streaming, that is of interest to the stations within the NAN data link network. Participant stations in a NAN data link network receive services by associating with other stations in the network. Stations participating in a NAN data link network may be referred to as a data path (DP) group, a NAN DP group, or a mesh group. A station participating in a NAN data link network that is interested in a service available over the network may be referred to as a subscriber, a receiver or a recipient. A station that provides are particular service may be referred to as a provider or a transmitter. NAN data link networks do not depend on network infrastructure, such as access points or Wi-Fi direct group formation to access services. In this sense, NAN data link networks are considered to be infrastructure less. NAN data link networks may also be referred to as NDL networks, social Wi-Fi mesh networks, SWF-mesh networks, or NAN data path (NDP) networks.

While some aspects of operation of a NAN data link network are based on IEEE 802.11s protocol specific to mesh networks, there are differences between a NAN data link network and a mesh network. For example, NAN data link networks eliminate discovery beaconing from the NAN data link channel. This is beneficial in that it eliminates the overhead associated with 802.11s beaconing, wherein participating stations have to periodically beacon. However, because there is no beaconing on the NAN data link channel, discovering stations cannot identify neighbor stations for association. Furthermore, once a station becomes a participating station of a NAN data link network, the station needs to identify changes in its neighborhood due to mobility of other stations entering and exiting the NAN data link network. Again, because there is no beaconing on the NAN data link channel, discovering stations cannot maintain an accurate record of participating stations.

It would be beneficial to provide for service discovery of a service of interest, and NAN data link network participant changes, through a NAN data link network without having to introduce beaconing over the NAN data link channel.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved narrowband channel selection for devices in a wireless network.

A method, an apparatus, and a computer program product for wireless communication are provided. In one aspect of the disclosure, a first station discovers a second station capable of providing a service of interest to the first station. The second station is one of a plurality of stations participating in a NAN data link network that provides the service of interest and supports communication over a NAN data link channel without beaconing. The second station is discovered through communication over a NAN channel supported by a plurality of neighborhood stations forming a NAN network. The NAN channel has a beaconing operation that provides synchronization. After discovery of the second station, the first station communicates with the second station over the NAN data link channel, to obtain data corresponding to the service of interest.

BRIEF DESCRIPTION OF THE DRAWINGS

FIGS. 8A, 8B, 8C, and 8D include flow charts of methods of wireless communications by a discovering station over a NAN channel supported by a NAN network and a NAN data link channel supported by a NAN data link network, in which aspects of the present disclosure may be employed.

FIGS. 10A, 10B, and 10C include flow charts of methods of wireless communications by a providing station over a NAN channel supported by a NAN network and a NAN data link channel supported by a NAN data link network, in which aspects of the present disclosure may be employed.

DETAILED DESCRIPTION

Figure 1:
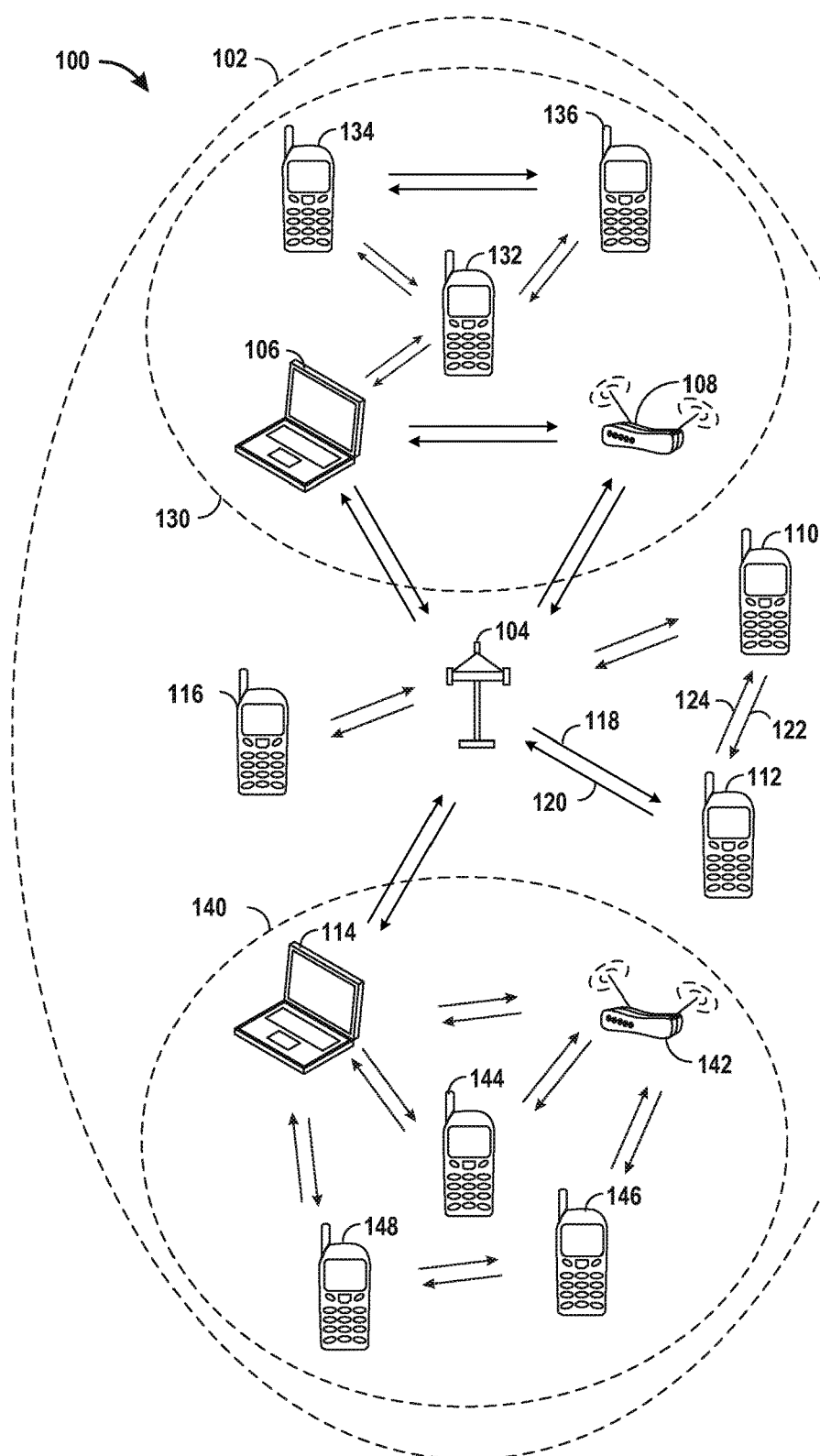
FIG. 1 shows an example wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The term "associate," or "association," or any variant thereof, such as for example "peering" within the context of a mesh association, should be given the broadest meaning possible within the context of the present disclosure. By way of example, when a first apparatus associates with a second apparatus, it should be understood that the two apparatus may be directly associated or intermediate apparatuses may be present to provide an association between the two devices. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, terminology that recites at least one of a combination of elements (e.g., "at least one of A, B, or C") refers to one or more of the recited elements (e.g., A, or B, or C, or any combination thereof).

As described above, NAN networking, also known as social Wi-Fi networking, is a networking approach wherein devices advertise services that they may provide and/or discover the services of nearby devices. Devices, such as a group of stations, may form a NAN network. For example, various stations within a NAN network may communicate on a device-to-device (e.g., peer-to-peer communications) basis with one another regarding applications that each of the stations supports. It is desirable for a discovery protocol used in a NAN network to enable stations to advertise themselves (e.g., by sending discovery packets) as well as discover services provided by other stations (e.g., by sending paging or query packets), while ensuring secure communication and low power consumption. It should be noted that a discovery packet may also be referred to as a discovery message or a discovery frame. It should also be noted that a paging or query packet may also be referred to as a paging or query message or a paging or query frame.

As also described above, a NAN data link network, as known as social Wi-Fi mesh network, is a network of devices or stations that typically supports one or more services or applications, e.g., music streaming, that is of interest to the stations within the NAN data link network.

Participant stations in a NAN data link network receive services by associating with other stations in the network. NAN data link networks do not depend on network infrastructure, such as access points to access services. In this sense, NAN data link networks are infrastructure less.

FIG. 1 shows an example wireless communication system 100 in which aspects of the present disclosure may be employed. The wireless communication system 100 may include a NAN network 102, with one or more overlying NAN data link networks 130, 140. Some aspects of the NAN network 102 may operate pursuant to a wireless standard, for example the IEEE 802.11 standard.

The NAN network 102 may include an access point 104 that directly communicates with one or more stations, e.g., stations 106, 108, 110, 112, 114, and 116, and indirectly with additional stations, e.g., stations 132, 134, 136, 142, 144, 146, 148, through intervening stations. The stations forming a NAN network may be referred to as a NAN cluster. In some implementations a station may be used as an access point. In general, an access point may serve as a hub or base station for the NAN and a station may serve as a user of the NAN. A station may connect to an access point via a Wi-Fi (e.g., IEEE 802.11 protocol) compliant wireless link to obtain general connectivity to the Internet.

A station may be a laptop computer, a personal digital assistant (PDA), a mobile phone, etc. A station may also comprise, be implemented as, or known as an access terminal (AT), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

A variety of processes and methods may be used for transmissions in the NAN network 102 between the access point 104 and the stations 106, 108, 110, 112, 114, 116. For example, signals may be sent and received between the access point 104 and the stations 106, 108, 110, 112, 114, 116 in accordance with OFDM/OFDMA techniques.

A communication link that facilitates transmission from the access point 104 to one or more of the stations 106, 108, 110, 112, 114, 116 may be referred to as a downlink (DL) 118, and a communication link that facilitates transmission from one or more of the stations to the access point 104 may be referred to as an uplink (UL) 120. Alternatively, a downlink 118 may be referred to as a forward link or a forward channel, and an uplink 120 may be referred to as a reverse link or a reverse channel. In some aspects, DL communications may include unicast or multicast traffic indications.

A communication link may be established between stations 106, 108, 110, 112, 114, 116 of the NAN network 102. Some possible communication links between stations are illustrated in FIG. 1. As an example, a first communication link 122 may facilitate transmission from a first station 110 to a second station 112. A second communication link 124 may facilitate transmission from the second station 112 to the first station 110.

The access point 104 may act as a base station and provide wireless communication coverage in an area corresponding to the boundary of the NAN network 102. The access point 104 along with the stations 106, 108, 110, 112, 114, 116 associated with the access point 104 and that use the access point 104 for communication form the NAN network. It should be noted that the NAN network 102 may not have an access point 104, but rather may function as a peer-to-peer network between the stations 106, 108, 110, 112, 114, 116. For example, in a NAN network, stations may or may not be connected to an access point or be part of a Wi-Fi direct connection. These stations may be out of cellular coverage and form their own ad hoc network. Accordingly, the functions of the access point 104 described herein may alternatively be performed by one or more of the stations 106, 108, 110, 112, 114, 116.

The access point 104 may transmit a beacon signal (or simply a "beacon") on one or more channels via a communication link, such as the downlink 118. The channels over which beacons are transmitted may be multiple narrowband channels, and each channel may include a frequency bandwidth. The beacon is transmitted to other nodes (stations) of the wireless communication system 100, and provides for timing synchronization between the other stations and the access point 104. The beacon may provide other information or functionality. Such beacons may be transmitted periodically. The period between successive beacon transmissions may be referred to as a superframe. Transmission of a beacon may be divided into a number of groups or intervals. The beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g., shared) amongst several stations, and information specific to a given station.

A station (e.g., station 116) may be required to associate with the access point 104 in order to send communications to and/or receive communications from the access point 104. In one aspect, information for associating is included in a beacon broadcast by the access point 104. To receive such a beacon, the station 116 may, for example, perform a broad coverage search over a coverage region. A search may also be performed by the station 116 by sweeping a coverage region in a lighthouse fashion, for example. After receiving the information for associating, the station 116 may transmit a reference signal, such as an association probe or request, to the access point 104. The access point 104 may use backhaul services, for example, to communicate with a larger network, such as the Internet or a public switched telephone network (PSTN).

The one or more NAN data link networks 130, 140 are formed by a number of stations from the NAN network 102. The stations of a NAN data link network 130, 140 are a subset of the group of stations, e.g., the NAN cluster, forming the NAN network 102. The stations of a NAN data link network 130, 140 may be referred to as a data path group, a NAN DP group, or a mesh group. A first NAN data link network 130 is formed by stations 106, 108, 132, 134 and 136. A second NAN data link network 140 is formed by stations 114, 142, 144, 146 and 148. A NAN data link network 130, 140 typically supports one or more services or applications, e.g., music streaming, that is of interest to the stations within the NAN data link network. In accordance with aspects of the disclosure, communications for purposes of peer discovery is implemented over a communications channel supported by the NAN network 102 that includes discovery and synchronization, while communications for post-discovery purposes is implemented over a different communications channel supported by a NAN data link network 130, 140.

Figure 2:
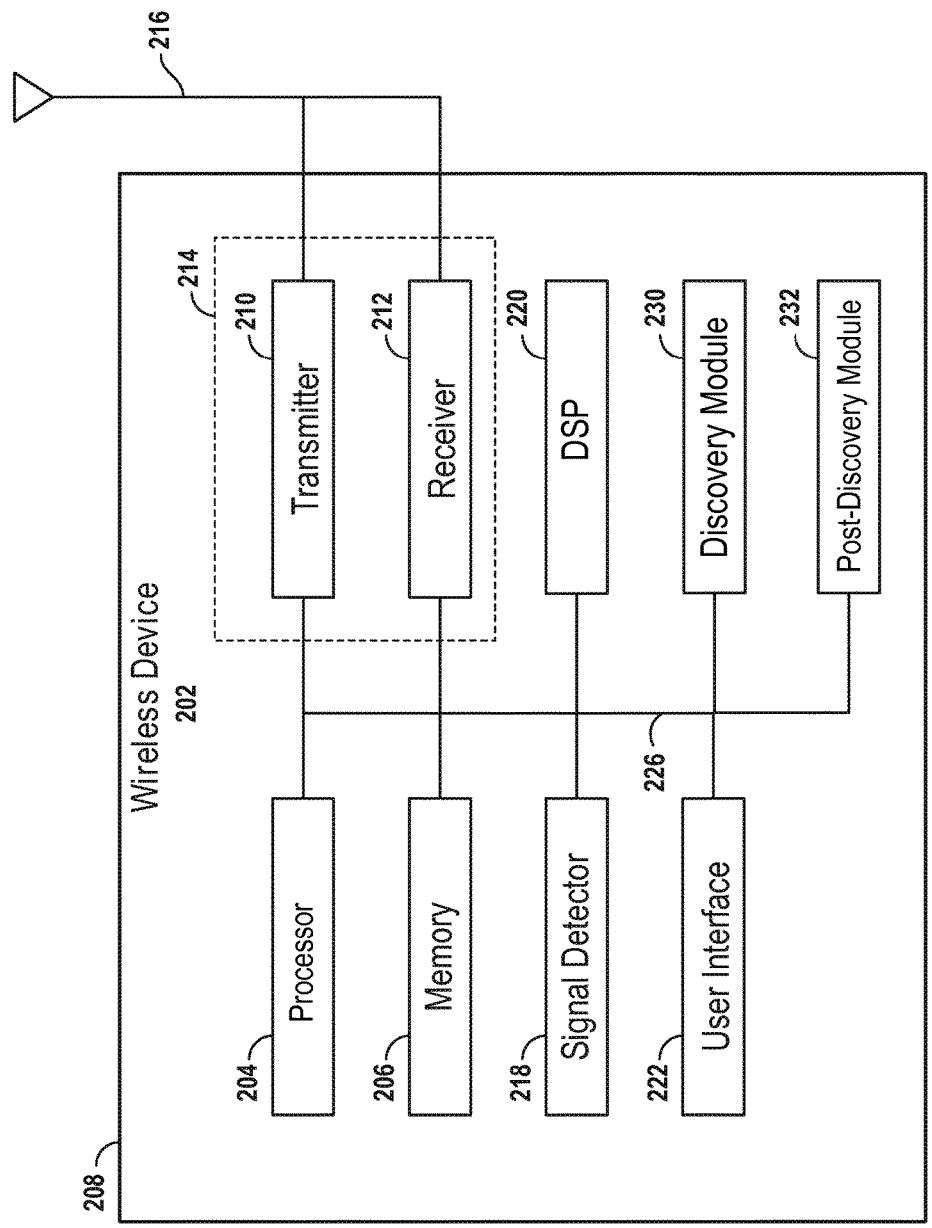
FIG. 2 shows a functional block diagram of an example wireless device that may be employed within the wireless communication system of FIG. 1.

FIG. 2 shows an example functional block diagram of a wireless device 202 that may be employed within the wireless communication system 100 of FIG. 1. The wireless device 202 is an example of a device that may be configured to implement the various methods described herein. The wireless device 202 may be one of the stations 106, 108, 110, 112, 114, 116 of FIG. 1, and is referred to below as a station.

The station 202 may include a processor 204 which controls operation of the station 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The station 202 may also include a transmitter 210 and/or a receiver 212 to allow transmission and reception of data between the wireless device 202 and a remote location. The transmitter 210 and receiver 212 may be combined into a transceiver 214. An antenna 216 may be attached to a housing 208 and electrically coupled to the transceiver 214. The wireless device 202 may also include multiple transmitters, multiple receivers, multiple transceivers, and/or multiple antennas.

The station 202 may also include a signal detector 218 that may be used to detect and to quantify the level of signals received by the transceiver 214. The signal detector 218 may detect such signals as total energy, energy per subcarrier per symbol, power spectral density and other signals. The station 202 may also include a DSP 220 for use in processing signals. The DSP 220 may be configured to generate a packet for transmission. In some aspects, the packet may comprise a physical layer data unit (PPDU).

The station 202 may includes a discovery module 230 and a post-discovery module 232 used to support discovery and communication between the station 202 (referred to going forward, as the "first station") and another station (referred to going forward, as a "second station"). The discovery module 230 may be configured to discover a second station capable of providing a service of interest to a first station. The second station may be discovered through communication over a first channel, e.g., a NAN channel, supported by a plurality of neighborhood stations forming a NAN network. The second station is one of a plurality of stations participating in a NAN data link network that supports communication over a second channel, e.g., a NAN data link channel. After discovery of the second station, the post-discovery module 232 of the first station communicates with the second station over the second channel, to obtain data corresponding to the service of interest.

The NAN channel supported by the NAN network may be a NAN channel that provides periodic discovery frames and synchronization beacons during discover windows that allow for discovery by stations. The second channel supported by a NAN data link network may be a NAN data link channel that provides for content delivery or service delivery during periodic transmission windows. The second channel typically does not provide discovery frames and synchronization beacons, but instead relies on the first channel for these functions. A NAN data link network may be described as being built on top of the NAN network. The NAN network and the NAN data link network may or may not operate on the same channel/frequency. Parameters or attributes provided by the NAN data link network for each service provide information on the NAN data link channel carrying the service.

The station 202 may further comprise a user interface 222 in some aspects. The user interface 222 may comprise a keypad, a microphone, a speaker, and/or a display. The user interface 222 may include any element or component that conveys information to a user of the station 202 and/or receives input from the user.

The various components of the station 202 may be coupled together by a bus system 226. The bus system 226 may include a data bus, for example, as well as a power bus, a control signal bus, and a status signal bus in addition to the data bus. Components of the station 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
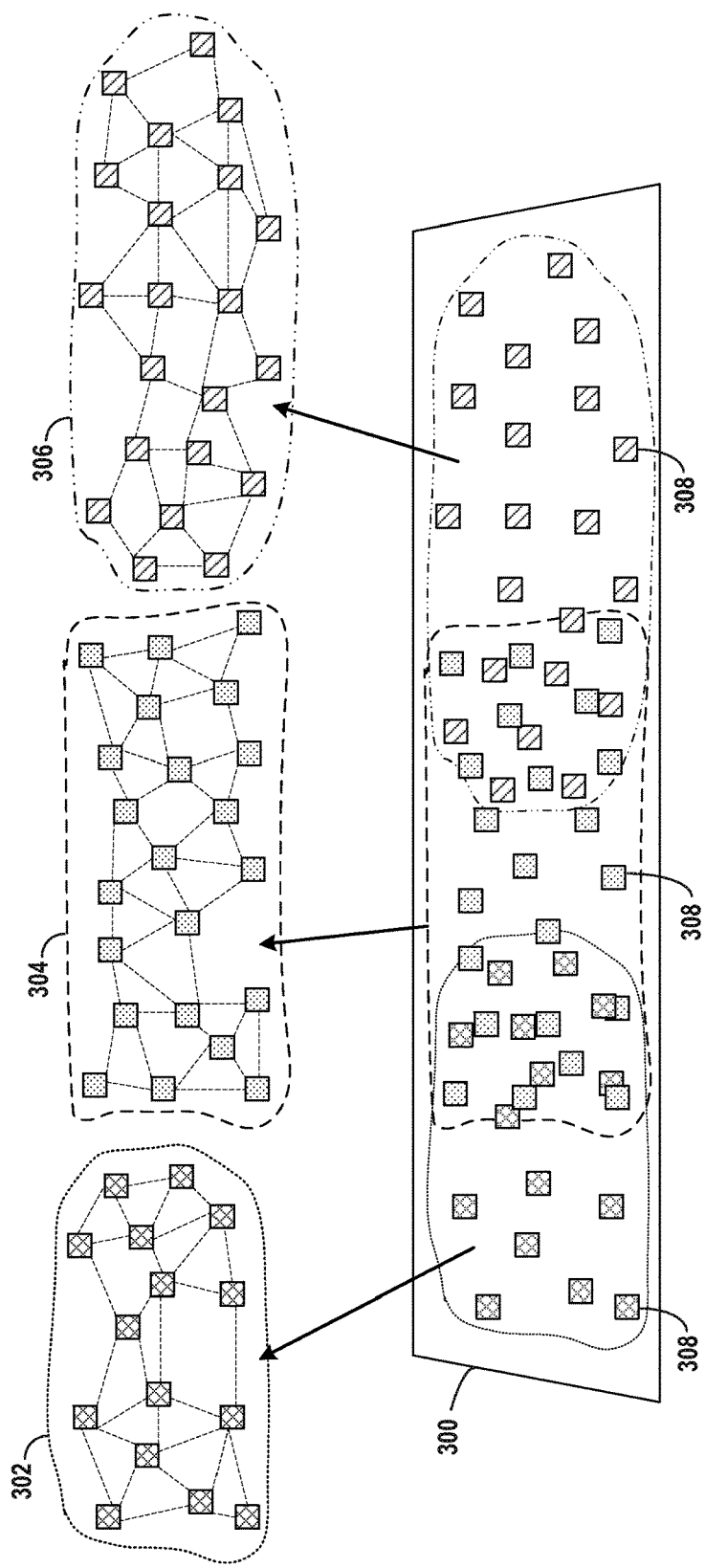
FIG. 3 shows an example neighbor awareness networking (NAN) network including several overlying NAN data link networks each providing a data communication network for a particular service or application, in which aspects of the present disclosure may be employed.

FIG. 3 shows an example NAN network 300 including several overlying NAN data link networks 302, 304, 306, each providing a data communication network for a particular service or application, in which aspects of the present disclosure may be employed. The NAN network 300 consists of a number of stations 308, each supporting a first communications channel, referred to as a "NAN channel." The stations 308 within a NAN network 300 have synchronized clocks, wake up together periodically for discovery and operate on the same NAN channel. The NAN channel may support beaconing and synchronization in accordance with IEEE 802.11 standard, as describe above with reference to FIG. 1. A station 308 within in a NAN network may be referred to as a "neighborhood station."

Each of the NAN data link networks 302, 304, 306 is formed by a number of stations 308 from the NAN network 300. A NAN data link network 302, 304, 306 typically supports one or more services or applications, e.g., music streaming, that is of interest to the stations within the NAN data link network. The stations 308 within a respective NAN data link network 302, 304, 306 support a second communication channel, referred to as a "NAN data link channel." The NAN data link channel supports the transport of data related to the one or more services supported by the NAN data link network 302, 304, 306. The NAN data link channel typically does not provide beaconing or synchronization and relies on the underlying NAN network 300 for synchronization. The group of stations, e.g., data path group, NAN data path group, participating in the NAN data link network 302, 304, 306 may be single hop or multi hop, may share a paging window, and may have common security credentials. Based on security credentials, a data path group may be restricted, in which case the data path group may require an out-of-band credential. A station 308 within a NAN data link network 302, 304, 306 may proxy service discovery messages of other stations within the NAN data link network and may forward data related to the services supported by the NAN data link network. A station 308 participating in a NAN data link network may be referred to as a "station." A station 308 that is both within a NAN network and participates in a NAN data link network may be referred to as either or both of a station and a neighborhood station.

In summary, the NAN network 300 provides beaconing, synchronization, and small advertisement and subscription frames that allow stations to discover services. The main purpose of the NAN network 300 is to aid service discovery. As previously mentioned, NAN network specifications do not address data exchange among stations 308 participating in the NAN network 300. Accordingly, there is no exchange of data through the NAN network. On the other hand, the NAN data link network 302, 304, 306 is built on top of the NAN network 300 to aid post discovery connectivity, to thereby support data exchange.

Figure 4:
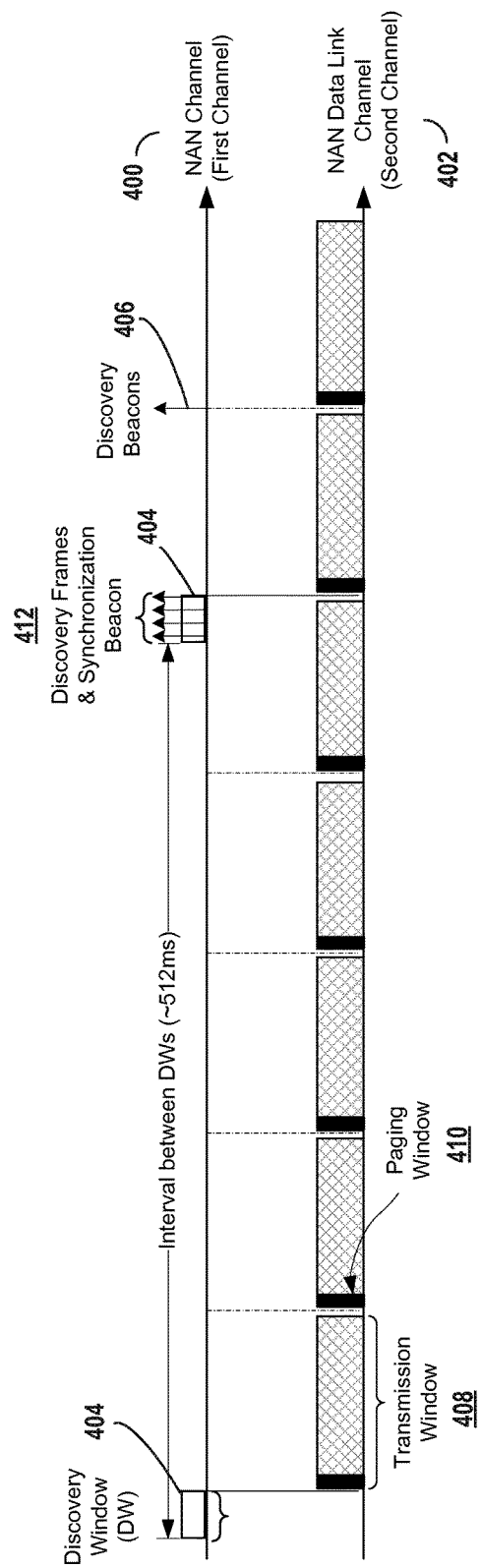
FIG. 4 shows an example timeline of transmissions over a NAN channel of a NAN network, and an example timeline of transmissions over a NAN data link channel of a NAN data link network, in which aspects of the present disclosure may be employed.

FIG. 4 shows an example timeline for transmissions over a NAN channel 400 and transmissions over a NAN data link channel 402, in which aspects of the present disclosure may be employed. The NAN channel may operate on a particular channel or frequency, e.g., channel 6. The NAN channel 400 timeline consists of discovery windows 404 and discovery beacons 406. Discovery windows 404 are 16 ms long and occur periodically, e.g., every 512 ms. During each discovery window 404, all of the stations within a NAN network 300 are awake. Discovery frames or discovery messages, and synchronization beacons 412 are transmitted during the discovery window 404. Discovery messages may include service advertisement broadcast messages that advertise what service a station can provide and service discovery messages that indicate a service that a station is seeking A service advertisement message may include attributes of the NAN data link network providing the service, a service identification (e.g., a hash of the service name), an instance identification (e.g., a publish ID and/or subscribe ID), etc. The attributes help new stations join the NAN data link network to get the service. The synchronization beacon is used for timing correction for existing stations within the NAN network 300.

Discovery beacons 406 are transmitted during the interval between adjacent discovery windows 404. Discovery beacons 406 are used by stations outside of a NAN network to locate an existing NAN network it may be interested in joining. Only a subset of stations 308 within the NAN network 300 awake to transmit discovery beacons 406.

The NAN data link channel 402 may or may not operate on the same channel/frequency as the NAN channel 400. The NAN data link channel 402 consists of spaced apart transmission windows 408. Each transmission window 408 includes a paging window 410. The paging window 410 is a period of time during which all stations participating in a NAN data link network 302, 304, 306 wake up, i.e., enter an active state. As previously mentioned, stations in NAN data link network 302, 304, 306 do not beacon on the NAN data link channel 402. Accordingly, an alternate mechanism is used to indicate traffic to sleeping stations in the NAN data link network 302, 304, 306. The paging window 410 at the beginning of each transmission window 408 is used to indicate if a station has traffic to send. In a NAN data link network 302, 304, 306, all stations are synchronized in time with respect to wake-up and transmission. All participating stations wake up during the paging window 410 to listen (or to send) their traffic indication. Stations sleep (enter power saving mode) during the remainder of the transmission window 408 if there is no traffic indicated during the paging window 410. Transmission windows 408 and paging windows 410 of the NAN data link channel 402 may repeat between consecutive discovery windows 404 of the NAN channel 400. Routing message (e.g., PREQ, PREP, RANN, etc.) may be sent during transmission windows as all stations are expected to be awake.

Thus, a station may operate on the NAN channel 400 on a particular channel/frequency during the discovery windows 404 of the channel. During these times, the station may perform discovery functions. During the time between consecutive discovery windows 404 of the NAN channel 400, the station may operate on the NAN data link channel 402 on a particular channel/frequency that may or may not be the same as the channel/frequency of the NAN channel 400. During the transmission windows 408 of the NAN data link channel 402, the station may perform content delivery functions.

Described below are three implementations for peer discovery and communication related to communications networks, including in particular NAN networks and NAN data link networks. The implementations allow for peer discovery by peer devices (or peer stations) via communications over a first channel of a NAN network and post-discovery communication, e.g., content communications, over a second channel of a NAN data link network. Peer stations, as used herein may refer to stations that are—for purposes of post-discovery communication—within one hop of the NAN data link network that provides a service of interest to the station. The actual NAN data link network itself, may be multi-hop and the content provided may be multiple hops away from the peer station interested in receiving the content. The NAN data link network may support multi-hop data delivery.

Solicited Service/Peer Discovery

Figure 5:
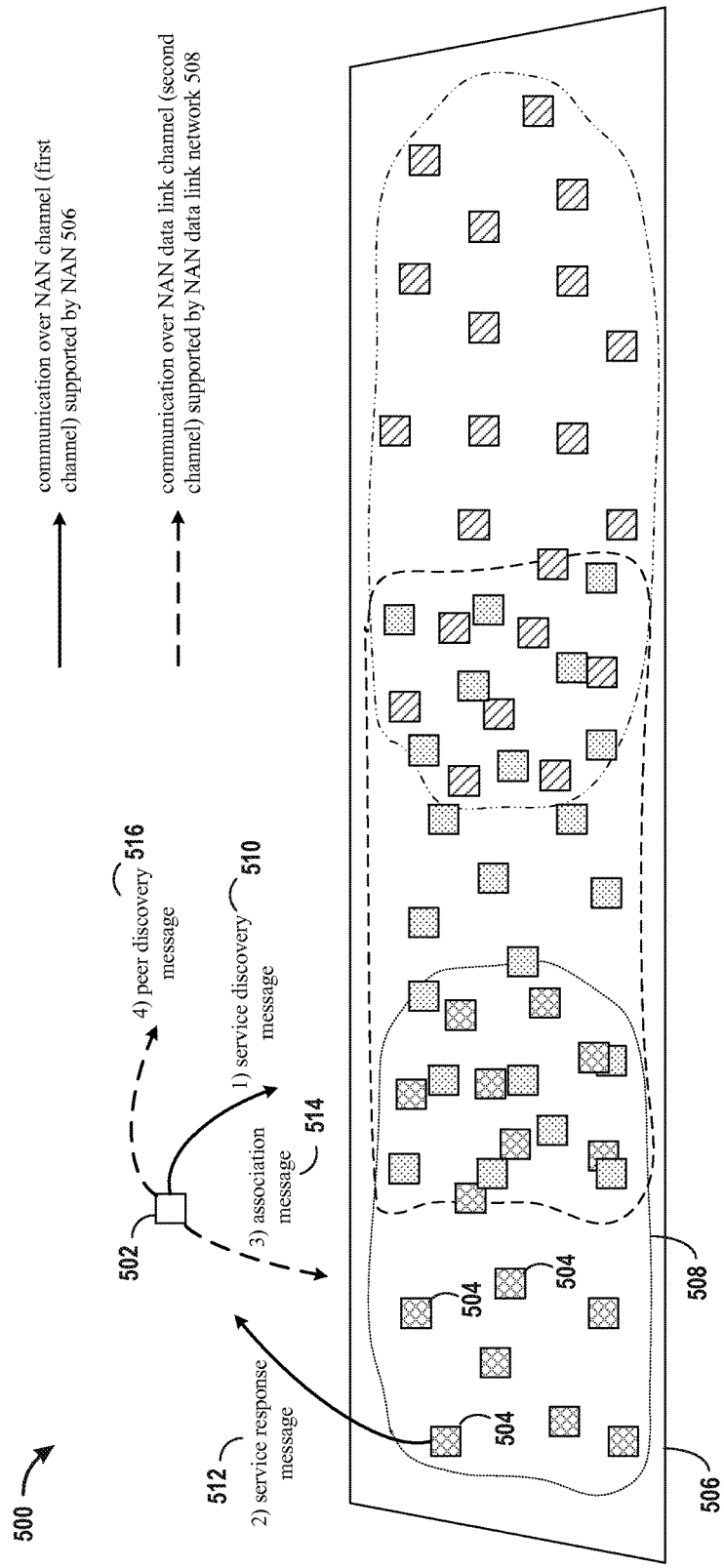
FIG. 5 shows an example scenario of solicited peer discovery by a discovering station, in which aspects of the present disclosure may be employed.

FIG. 5 shows an example scenario 500 of solicited peer discovery by a station 502 (herein referred to as a "discovering station") searching for a service, in which aspects of the present disclosure may be employed. A discovering station 502 searching for a service sends a service discovery message 510. The discovering station 502 may also be referred to as a subscriber, a receiver, or a recipient. The discovering station 502 may be part of a NAN network 506. However, for clarity of illustration, the discovering station 502 in FIG. 5 is shown outside of the box bounding the NAN network 506. The service discovery message 510, which may be a simple subscribe message, includes information (e.g., service name, service identification, etc.) on a service that the discovering station 502 is interested in receiving. With reference to FIG. 4, the service discovery message is sent over a NAN channel 400 during a discovery window 404. In some implementations, the service discovery message 510 may be a broadcast message.

One or more stations 504 within a NAN network 506 capable of providing the service, either directly or as a proxy, may send a service response message 512 in response to the service discovery message 510. In this context, the one or more stations 504 that send a service response message may be referred to as a "responding station." The service response message 512 includes information corresponding to and identifying a NAN data link network 508 that provides the service. The responding station 504 is part of the identified NAN data link network 508. The information included in the service response message 512 may include the parameters, such as a NAN data link ID, NAN data link channel, NAN data link transmission schedule, and NAN data link key, of the NAN data link network 508. With reference to FIG. 4, the service response message is sent over a NAN channel 400 during a discovery window 404. The service response message 512 is typically sent in a discovery window, subsequent to the discovery window in which the service discovery message 510 was sent.

Upon receipt of the service response message 512, the discovering station 502 has sufficient information, as provided by the NAN data link parameters included in the service response message, to determine a NAN data link network 508 that provides the service, and to create a list of stations 504 in the NAN data link network 508 and the NAN network 506. The discovering station 502 may then send an association message 514 to associate with one of the stations 504 within the identified NAN data link network 508. The association message 514 sent by the discovering station 502 may include physical and MAC layer capabilities of the discovering station 502, along with security information (e.g., one or more nonce values) needed for establishing a security key between the discovering station 502 and a station 504 within the identified NAN data link network 508 to encrypt data traffic between them. Physical and MAC layer capabilities may include data rate, which encoding scheme to use, and the security algorithm supported. Based on the information included in the association message 514, the discovering station 502 and a station within the identified NAN data link network 508 establish a peering arrangement. With reference to FIG. 4, the association message is sent over the NAN data link channel 402 during a paging window 410 when all the stations 504 participating in the NAN data link network 508 are expected to be awake.

The discovering station 502 may periodically send or broadcast a peer discovery message 516 over the NAN data link channel. The peer discovery message 516 includes information regarding the PHY/MAC capabilities of the discovering station 502. The peer discovery message 516 may include additional information, such as the current number of peers of the discovering station 502, the service to which the discovering station 502 is subscribed, and the number of accepting peers. This information may be used by stations neighboring the discovering station 502 to decide whether to respond to the peer discovery message 516. The discovering station 502 may receive response messages from stations, and update its list of neighborhood stations based on the response messages.

The foregoing solicited approach involves active sending of requests by the discovering station 502. This approach may not be optimal in cases where power conservation and extended battery life for the station are of concern. This approach may be beneficial for stations that have a lot of power or are connected to a power source.

Unsolicited Service/Mesh Discovery Followed by Solicited Peer Discovery

Figure 6:
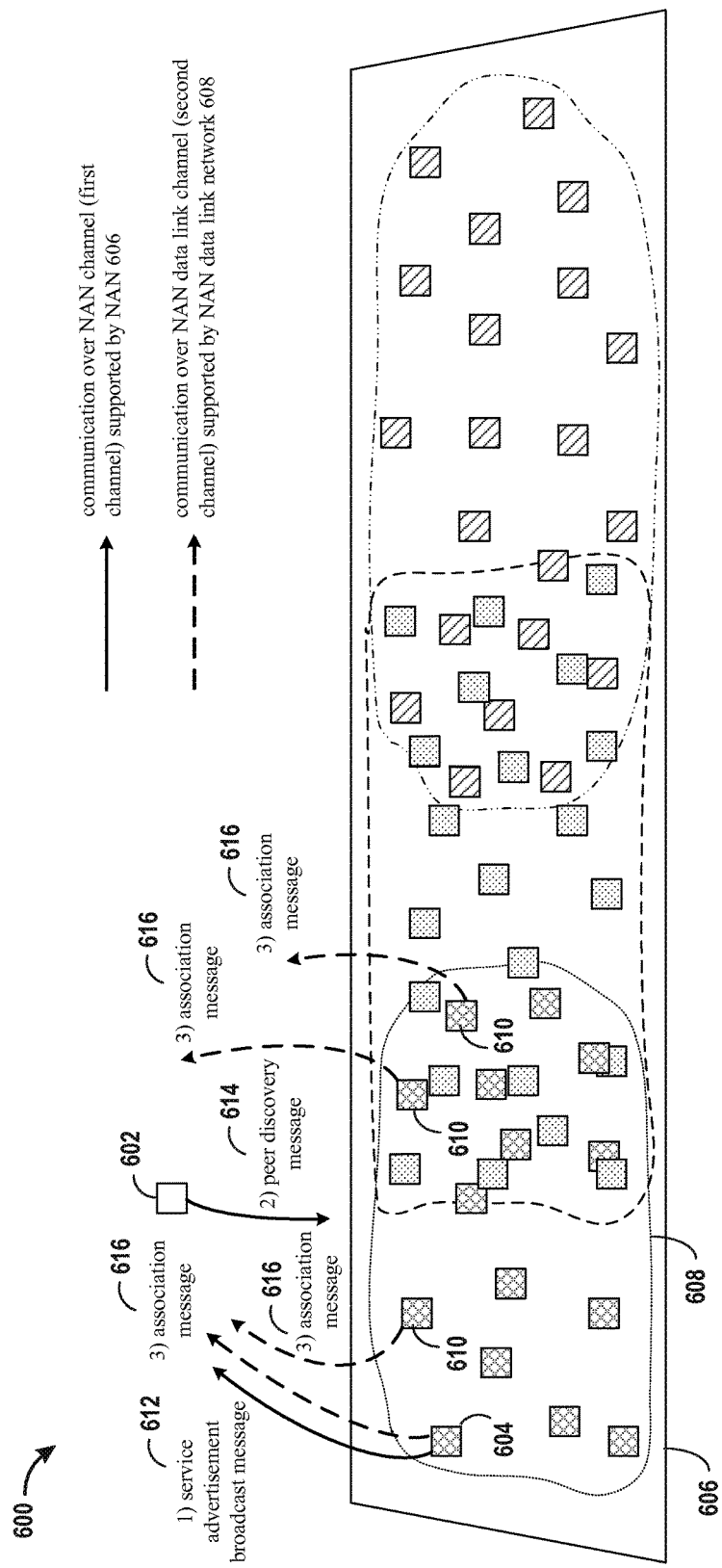
FIG. 6 shows an example scenario of unsolicited service and mesh discovery by a discovering station, in which aspects of the present disclosure may be employed.

FIG. 6 shows an example scenario 600 of unsolicited service and mesh discovery by a discovering station 602, followed by peer discovery, in which aspects of the present disclosure may be employed. The discovering station 602 may be part of a NAN network 606. However, for clarity of illustration, the discovering station 602 in FIG. 6 is shown outside of the box bounding the NAN network 606. One or more stations 604 in a NAN data link network 608 within a NAN network 606 may send a service advertisement broadcast message 612. In this context, the one or more stations 604 that send a service advertisement broadcast message 612 may be referred to as an "advertising station." The advertising station 604 that sends the service advertisement broadcast message 612 may provide the service directly or serve as a proxy for another station that provides the service. In the latter case, the other station that provides the service allows for multi-hop service discovery. With reference to FIG. 4, the service advertisement broadcast message may be sent during a discovery window 404 of the NAN channel 400.

The service advertisement broadcast message 612 includes information corresponding to the service and the parameters corresponding to the NAN data link network 608 that provides the service being advertised. The parameters may include a NAN data link ID, a NAN data link channel, NAN data link transmission schedule, and a NAN data link key. The service advertisement broadcast message 612 allows the discovering station 602 to discover the service and to find the NAN data link network 608 where the service is being delivered. In this implementation, the discovering station 602 is not sending a service discovery message as in the first implementation. This is advantageous in that it conserves power of the discovering station 602.

Once the discovering station 602 receives a service advertisement broadcast message 612 advertising a service in which the discovering station 602 is interested, the discovering station may send a peer discovery message 614. With reference to FIG. 4, the peer discovery message 614 is sent during the discovery window of the social Wi-Fi-channel 400 channel, subsequent the discovery window during which the service advertisement broadcast message was sent. The peer discovery message 614 includes information about the service and the NAN data link network 608 that the discovering station 602 wishes to join. The peer discovery message 614 may be limited to one hop if the discovering station 602 is interested in a one hop neighborhood. In other words, the peer discovery message 614 is received by stations that are one hop from the discovering station 602, and the receiving stations do not forward the message to other stations.

Since all stations within the NAN network 606, including all stations 604, 610 within the NAN data link network 608 providing the service of interest, are awake and available during the discovery window 404, the neighborhood stations can receive the peer discovery message 614 sent by the discovering station 602. Neighboring stations 604, 610 that are within one hop of the discovering station 602 and are part of the NAN data link network 608 receive the peer discovery message 614 from the discovering station 602.

One or more of the neighboring stations 604, 610 that are part of the NAN data link network 608 may now send an association message 616. An association message 616 sent by a neighboring station 604, 610 may include physical and MAC layer capabilities of the neighboring station, along with security information (e.g., one or more nonce values) needed for establishing a security key between the discovering station 602 and the neighboring station 604, 610 to encrypt data traffic between them. With reference to FIG. 4, an association message may be sent by one or more neighboring stations 604, 610 during a paging window 410 of the NAN data link channel 402. The association message 616 sent by a neighboring station 604, 610 provides information about that particular neighboring station that allows the discovering station 602 to peer with the neighboring station 610 within the NAN data link network 608 and thereby join the NAN data link network.

In a dense NAN network 606, transmission of a peer discovery message 614 over a NAN channel may result in a large number of association messages 616 from stations 604, 610 within the NAN data link network 608. In one implementation, the discovering station 602 may selectively peer based on one or more criteria. For example, the discovering station 602 may choose to peer with stations that are close to the discovering station 602. The discovering station 602 may determine the closeness of a station 604, 610 based on a measure of signal strength. For example, the discovering station 602 may receive an association message 616 from a station, determine a signal strength of the association message 616, and determine whether to peer with the station based on the determined signal strength. The signal strength determined by the discovering station 602 may be a received signal strength indication (RSSI) measurement and the discovering station 602 may peer with stations 604, 610 having a RSSI measurement above a threshold value.

In another scenario, the discovering station 602 may choose to peer with a mixture of stations that are close to the discovering station and stations that are further away from the discovering station. Doing so may provide uniform coverage for all stations participating in the NAN data link network 608, as the participating stations are more geographically disperse. This may avoid the situation where distant stations are left out of the NAN data link network 608 because all stations chose to peer with stations that are close. A discovering station 602 may select a distant station for peering base on weak signal strength. In other words, a discovering station may obtain signals from multiple other stations, compare the signal strengths, and select the station having the weakest signal strength.

In yet another scenario, a discovering station 602 may peer based on existing peer arrangements. For example, if a first potential station with which to peer is already peering with four other stations, and a second potential station with which to peer is only peering with two other stations, the discovering station may choose to peer with the potential station that has a lesser number of peers.

Simultaneous Service and Peer Discovery

Figure 7:
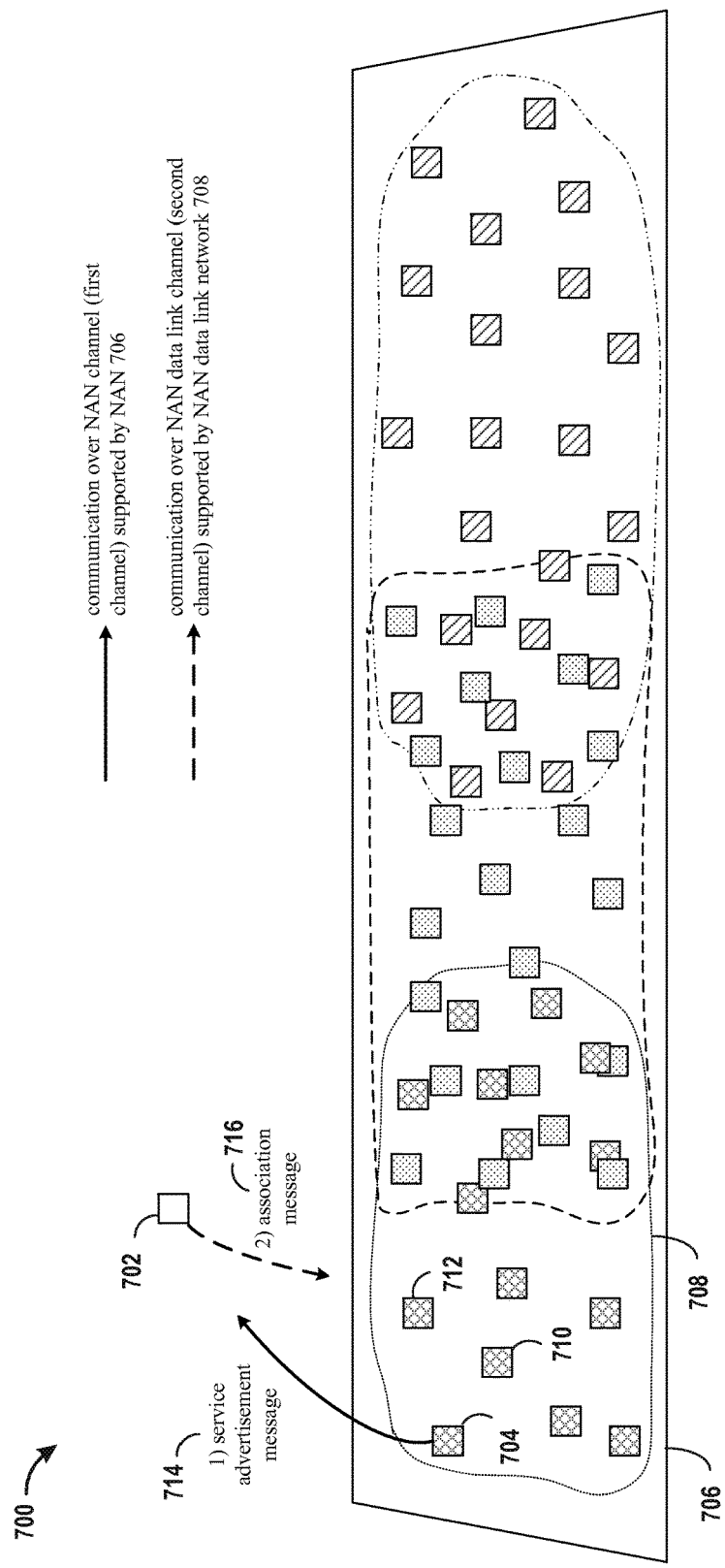
FIG. 7 shows an example scenario of simultaneous service and peer discovery by a discovering station, in which aspects of the present disclosure may be employed.

FIG. 7 shows an example scenario 700 of simultaneous service and peer discovery by a discovering station 702, in which aspects of the present disclosure may be employed. The discovering station 702 may be part of a NAN network 706. However, for clarity of illustration, the discovering station 702 in FIG. 7 is shown outside of the box bounding the NAN network 706. By way of background, a station 704 that is part of a NAN data link network 708 has knowledge of other stations within the same NAN data link network 708 and other stations within the NAN network 706 underlying the NAN data link network. This knowledge may be obtained from, for example, service advertisement broadcast messages sent by these other stations. These service advertisement broadcast messages include information corresponding to the parameters of the NAN data link network that provides the service being advertised. The NAN data link parameters may include a NAN data link ID, a NAN data link channel, NAN data link transmission schedule, and a mesh key.

Based on this knowledge, service advertisement messages 714 from a station 704 participating in a NAN data link network 708 may include—not only information corresponding to a service the station may provide, either directly as a "provider station," or indirectly as a "proxy station"—but also information corresponding to the NAN data link parameters and the NAN network 706. For example, the service advertisement messages 714 of a provider station 704 or a proxy station, can include information that identifies stations 710, 712 that are one-hop stations relative to the provider/proxy station 704.

When a discovering station 702 receives this service advertisement message 714 with NAN data link network 708 information and NAN network 706 information, the discovering station can direct an association message 716 to select stations. For example, if the discovering station 702 prefers to peer with a station that is only one-hop away, the discovering station 702 may directly send an association message 716 to all stations 704, 710, 712 within the one-hop neighborhood. The association message 716 sent by the discovering station 702 may include physical and MAC layer capabilities of the discovering station, along with security information (e.g., one or more nonce values) needed for establishing a security key between the discovering station 702 and the provider/proxy station 704, 710 or 712 to encrypt data traffic between the two stations. With reference to FIG. 4, the association message is sent over the NAN data link channel 402 during a paging window 410. The implementation of FIG. 7 bypasses the peer discovery message 614 sent by the discovering station 602 in the previous implementation of FIG. 6. Here, the discovering station 702 sends out an association message 716 instead of waiting to receive association messages from other stations.

Additional information in the association message 716 may indicate the station 704, 710, 712 with which the discovering station 702 peers. For example, the association message 716 may indicate a preference that the discovering station 702 peer with a proxy station that is within a specified number of hops to the station that provides the service. This may be beneficial in that reducing the number of hops between the provider station and the discovering station 702 reduces the latency of the service. In another example, the association message 716 may indicate a preference that the discovering station 702 peer with a station having a level of battery strength above a threshold. This is beneficial in that it may ensure the station being selected for peering by the discovering station 702 has power sufficient to maintain a peering arrangement with the discovering station for a sufficient amount of time. In another example, the association message 716 may indicate a limitation on the number of peers with which the discovering station 702 may peer. To this end, the Mesh Formation Info field and Mesh Capabilities Field of Mesh configuration element from 802.11s mesh standard could be used to indicate this number.

Over time, a NAN network may change due to station mobility or stations joining or leaving the NAN network or a NAN data link network overlying the NAN network.

Accordingly, in the implementations described above, a discovering station having peered with a station within a NAN network and overlying NAN data link network, may periodically send an peer discovery message. In response to the peer discovery message, the discovering station 702 may receive response messages from stations, and update its list of neighborhood stations based on information included in the response messages. Such information may include identifications of stations with which the station sending the response message is peering. In order to save battery life, a station may make intelligent decisions on when to send peer discovery messages for purposes of updating neighborhood information. Such decisions may be based on, for example, the time since a new station joined the NAN network or the NAN data link network, or responded to a peering request.

FIG. 8A is a method of wireless communication of a first station discovering a service. At step 802, the first station discovers a second station capable of providing a service of interest to the first station. The second station is discovered through communication over a first channel, e.g., a NAN channel, supported by a plurality of neighborhood stations forming a NAN network. The NAN channel provides beaconing and supports discovery and synchronization. The second station is one of a plurality of stations participating in a NAN data link network that supports communication over a second channel, e.g., a NAN data link channel. The second channel does not provide beaconing and does not support discovery and synchronization. Accordingly, the plurality of stations participating in the NAN data link network relies on the synchronization provided by the NAN channel. At step 804, after discovery of the second station, the first station communicates with the second station over the NAN data link channel, to obtain data corresponding to the service of interest.

At step 822, the first station may optionally send a peer discovery message over the NAN data link channel. At step 824, in response to messages received from one or more stations as a result of the peer discovery message, the first station may update a neighbor list corresponding to the plurality of neighborhood stations currently within the NAN network and participating in the NAN data link network. Such updating may include adding one or more new neighborhood stations to the neighbor list. The first station may then send an association message over the NAN data link channel to at least one of the new neighborhood stations.

FIG. 8B is flow chart of one implementation of station discovery. At step 806, and with additional reference to FIG. 5, a first station 502 discovers the second station 504 by sending a service discovery message 510 over the NAN channel. The service discovery message 510 includes information corresponding to and identifying the service of interest. At step 808 the first station 502 then receives a service response message 512 from at least one of the neighborhood stations, e.g., the second station 504. The service response message 512 includes information corresponding to a NAN data link network 508 that provides the service of interest. At step 810, the first station 502 then communicates with the second station by sending an association message 514 over the NAN data link channel to one or more of the stations within the NAN data link network identified in the service response message. The one or more stations include the second station 504.

FIG. 8C is flow chart of another implementation of station discovery. At step 812, and with additional reference to FIG. 6, a first station 602 discovers a second station 604 by receiving a service advertisement broadcast message 612 over the NAN channel. The service advertisement broadcast message 612 includes information corresponding to and identifying a service of interest and a NAN data link network 608 providing the service of interest. At step 814, the first station 602 then sends an peer discovery message 614 over the NAN channel to the plurality of neighborhood stations, wherein the plurality of neighborhood stations include a plurality of stations participating in the NAN data link network providing the service of interest. The peer discovery message 614 includes information corresponding to the service of interest and a NAN data link network that provides the service of interest. At step 816, the first station 602 then communicates with the second station 604 by receiving an association message 616 over the NAN data link channel from one or more of the stations 604, 610, that received the peer discovery message. The one or more of the plurality of stations 604, 610 include the second station.

Figure 9:
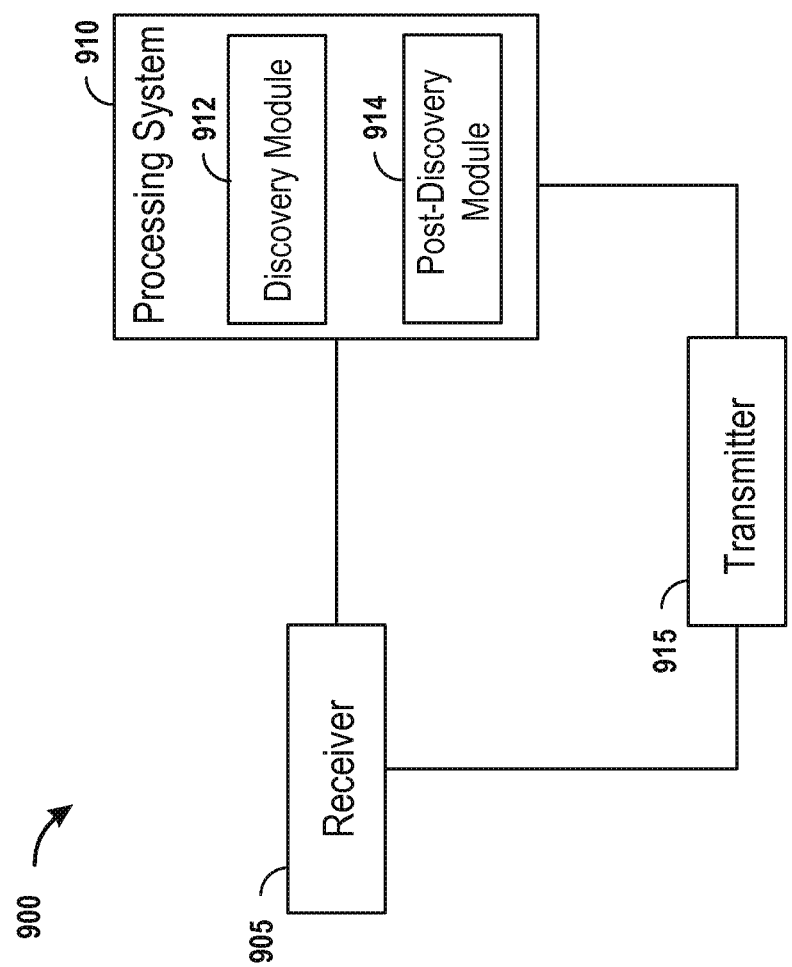
FIG. 9 is a functional block diagram of an example station for wireless communication device.

FIG. 8C is flow chart of another implementation of station discovery. At step 818, and with additional reference to FIG. 7, a first station 702 discovers a second station 704, 710, 712 by receiving a service advertisement message 714 over the NAN channel. The service advertisement message 714 includes information corresponding to and identifying a service of interest, a NAN data link network 708 providing the service of interest, and a NAN network 706. The service advertisement message 714 is sent by a station included in the NAN data link network 708 identified in the service advertisement message. At step 820, the first station 702 then communicates with the second station 704, 710, 712 by sending an association message 716 over the NAN data link channel to one or more of the plurality of stations within the NAN data link network identified in the service response message, wherein the one or more of the plurality of stations includes the second station FIG. 9 is a functional block diagram of an example station 900 for wireless communication. The station 900 may include a receiver 905, a processing system 910, and a transmitter 915. The processing system 910 may include a discovery module 912 and a post-discovery module 914.

The processing system 910 may correspond to the elements of the wireless device 202 shown in FIG. 2. The processing system 910, the transmitter 915, and/or the receiver 905 may be configured to discover a second station capable of providing a service of interest to the first station. The second station may be discovered by the discovery module 912 through communication over a first channel, e.g., a NAN channel, supported by a plurality of neighborhood stations forming a NAN network. The second station is one of a plurality of stations participating in a NAN data link network that supports communication over a second channel, e.g., a NAN data link channel. Discovery of the second station may be performed by the discovery module 912, the transmitter 915, and/or the receiver 905 in accordance with the method of FIG. 8 described above. To that end, one or more of the discovery module 912, the transmitter 915, and/or the receiver 905 are configured to perform the discovery aspects of the method of FIG. 8.

The post-discovery module 914, the transmitter 915, and/or the receiver 905 may be configured to, after discovery of the second station, communicate with the second station over the NAN data link channel, to obtain data corresponding to the service of interest. Communication with the second station may be performed by the post-discovery module 914, the transmitter 915, and/or the receiver 905 in accordance with the methods of FIGS. 8A, 8B, 8C and 8D described above. To that end, one or more of the post discovery module 914, the transmitter 915, and/or the receiver 905 are configured to perform the communicating aspects of the method of FIG. 8.

In one configuration, a station that implements the methods of FIGS. 8A, 8B, 8C and 8D includes means for discovering, through communication over a NAN channel supported by a plurality of neighborhood stations forming a NAN network, a second station capable of providing a service of interest to the first station, the second station being one of a plurality of stations participating in a NAN data link network that supports communication over a NAN data link channel, and means for communicating with the second station over the NAN data link channel. The station may also include means for sending a peer discovery message over the NAN data link channel and, means for updating, in response to messages received from one or more stations, a neighbor list corresponding to the neighborhood stations currently within the neighbor network.

In one implementation, the means for discovering may be configured to send a service discovery message over the NAN channel, the service discovery message including information corresponding to the service of interest; and to receive a service response message over the NAN channel from at least one of the plurality of neighborhood stations, the service response message including information identifying a NAN data link network that provides the service of interest over the NAN channel. In this implementation, the means for communicating is configured to send an association message over the NAN data link channel to one or more of the plurality of stations within the NAN data link network identified in the service response message, wherein the one or more of the plurality of stations includes the second station. In this case, the station may further include means for sending an peer discovery message over the NAN data link channel, and means for updating, in response to messages received from one or more stations, a neighbor list corresponding to the plurality of neighborhood stations currently within the NAN network. The means for updating may be configured to add one or more new neighborhood stations to the neighbor list, and the means for communicating may be configured to send an association message over the NAN data link channel to at least one of the one or more new neighborhood stations.

In another implementation, the means for discovering is configured to receive a service advertisement broadcast message over the NAN channel, the service advertisement broadcast message including information identifying a service of interest and a NAN data link network providing the service of interest; and to send an peer discovery message over the NAN channel to the plurality of neighborhood stations, wherein the plurality of neighborhood stations includes a plurality of stations that form the NAN data link network providing the service of interest, the peer discovery message including information corresponding to the service of interest and a NAN data link network that provides the service of interest. In this case, the means for communicating is configured to receive an association message over the NAN data link channel from one or more of the plurality of stations that received the peer discovery message, wherein the one or more of the plurality of stations includes the second station.

In yet another implementation, the means for discovering is configured to receive a service advertisement message over the NAN channel, the service advertisement message including information identifying a service of interest, a NAN data link network providing the service of interest, and a list of neighboring stations, the service advertisement message being sent by a station of the NAN data link network identified in the service advertisement message. In this case, the means for communicating is configured to send an association message over the NAN data link channel to one or more of the plurality of stations within the NAN data link network identified in the service advertisement message, wherein the one or more of the plurality of stations includes the second station.

The aforementioned means may be one or more of the processing system 910, the transmitter 915, and/or the receiver 905 of FIG. 9, or one or more of the components of the device of FIG. 2.

FIG. 10A is a flowchart of a method of wireless communication of a station in a NAN data link network that may provide a service of interest to a discovering station. At step 1006, and with additional reference to FIG. 5, the providing station 504 receives, from a discovering station 502, a service discovery message 510 over a first channel, e.g. a NAN channel. The service discovery message 510 includes information corresponding to a service of interest of the discovering station 502. At step 1008 the providing station 504 sends, over the NAN channel, a service response message 512 to the discovering station 502. The service response message 512 includes information corresponding to and identifying a NAN data link network 508 that provides the service of interest. At step 1010, the providing station 504 (or possibly another station in the NAN data link network that provides the service) receives an association message 514 over a second channel, e.g., a NAN data link channel, from the discovering station 502. Based on the association message 514, the providing station and the discovering station establish a peering arrangement by which the stations exchange data.

FIG. 10B is a flowchart of a method of wireless communication of a station in a NAN data link network that may provide a service of interest to a discovering station. At step 1012, and with additional reference to FIG. 6, a providing station 604 sends a service advertisement broadcast message 612 over a first channel, e.g., a NAN channel. The service advertisement broadcast message 612 includes information corresponding to a service and a NAN data link network providing the service. At step 1014, the providing station 604 receives over the NAN channel, a peer discovery message 614 from a discovering station 602 that is interested in the service advertised by the providing station. The peer discovery message 614 includes information corresponding to the service of interest and a NAN data link network 608 that provides the service of interest. At step 1016, the providing station 604 (or possibly another station 610 in the NAN data link network that provides the service) sends an association message 616 over the NAN data link channel to the discovering station 602. Based on the association message 616, the providing station 604, 610 and the discovering station 602 establish a peering arrangement by which the stations exchange data.

FIG. 10C is a flowchart of a method of wireless communication of a station in a NAN data link network that may provide a service of interest to a discovering station. At step 1018, and with additional reference to FIG. 7, a providing station 704 sends a service advertisement message 714 over a first channel corresponding to a NAN channel supported by a NAN network 706. The service advertisement message 714 includes information corresponding to a service, a NAN data link network 708 providing the service, and a list of neighboring stations participating in the NAN data link network. At step 1020, the providing station 704 (or possibly another station 710, 712 in the NAN data link network that provides the service) receives, over a second channel corresponding to a NAN data link channel, an association message 716 from a discovering station that is interested in the service. Based on the association message 716, the providing station 704, 710, or 712 and the discovering station 702 establish a peering arrangement by which the stations exchange data.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first station, comprising:
   sending a service discovery message over a first neighborhood awareness network (NAN) channel of a NAN network to discover whether one or more stations support an application of interest to the first station, wherein the service discovery message includes information that identifies the application of interest to the first station;
   receiving, in response to the service discovery message, a service response message over the first NAN channel from a second station that supports the application of interest to the first station, wherein the service response message includes information that identifies a NAN data link network that supports the application of interest to the first station;
   discovering that the second station supports the application of interest to the first station based on the service response message; and
   exchanging data related to the application of interest over a second NAN channel of the NAN data link network at a plurality of periodic windows with the second station, wherein synchronization of stations participating in the NAN data link network is unsupported by the second NAN channel, and the second NAN channel relies on the first NAN channel to provide the synchronization of all of the stations participating in the NAN data link network.

2. The method of claim 1, further comprising:
   sending an association message over the second NAN channel to the second station within the NAN data link network identified in the service response message.

3. The method of claim 1, further comprising:
   sending a peer discovery message over the second NAN channel;
   receiving, from each station of one or more stations that received the peer discovery message, a respective peer discovery response message; and
   updating, based on each respective peer discovery response message received from the one or more stations that received the peer discovery message, a neighbor list that identifies one or more stations participating in the NAN data link network.

4. The method of claim 3, wherein updating comprises adding one or more new stations to the neighbor list, wherein the one or more new stations include the one or more stations from which the first station received each respective peer discovery response message, and wherein the method further comprises:
   sending an association message over the second NAN channel to at least one of the one or more new stations.

5. The method of claim 1, further comprising:
   receiving, from a third station, a service advertisement broadcast message over the first NAN channel, the service advertisement broadcast message including information that identifies the application of interest to the first station and a NAN data link network that supports the application of interest to the first station; and
   sending a peer discovery message over the first NAN channel, the peer discovery message including information corresponding to the application of interest to the first station and the NAN data link network that supports the application of interest to the first station.

6. The method of claim 5, wherein sending the peer discovery message over the first NAN channel comprises sending the peer discovery message during a discovery window of the first NAN channel during which a plurality of neighborhood stations participating in the NAN data link network are awake.

7. The method of claim 5, further comprising:
   receiving an association message over the second NAN channel from one or more stations that received the peer discovery message.

8. The method of claim 7, wherein receiving the association message comprises receiving the association message during a paging window of the second NAN channel during which the first station is awake.

9. The method of claim 1, further comprising:
   receiving, from a third station, a service advertisement message over the first NAN channel, the service advertisement message including information that identifies: the application of interest to the first station, a NAN data link network that supports the application of interest to the first station, and a list of neighboring stations.

10. The method of claim 9, further comprising:
    sending an association message over the second NAN channel to the third station within the NAN data link network identified in the service advertisement message.

11. The method of claim 1, wherein the second station is a proxy for the application of interest to the first station.

12. The method of claim 1, further comprising:
    initiating an association with the second station during an assigned time period.

13. The method of claim 12, wherein synchronization provided via the first NAN channel supports a plurality of transmission windows in the second NAN channel during which the first station is expected to be awake for at least a portion of a transmission window, wherein the assigned time period is the transmission window of the second NAN channel, wherein the second NAN channel is a NAN data link channel.

14. The method of claim 13, wherein the assigned time period is a paging window during which a plurality of stations are expected to be in an awake mode, wherein the paging window is within the transmission window, and wherein the plurality of stations includes the first station and the second station.

15. The method of claim 1, further comprising:
    transmitting traffic indications associated with the application of interest during a paging window that is an initial portion of a transmission window of the second NAN channel, wherein the second NAN channel is a NAN data link channel.

16. The method of claim 15, wherein the first station stops communicating over the second NAN channel for a remainder of the transmission window if no traffic is indicated for the first station during the paging window and the first station has no traffic for transmission during the remainder of the transmission window.

17. The method of claim 15, wherein the first station enters a power save mode for the remainder of the transmission window if no traffic is indicated for the first station during the paging window and the first station has no traffic for transmission during the remainder of the transmission window.

18. The method of claim 1, further comprising:
    communicating with the second station over the second NAN channel to obtain data corresponding to the application of interest to the first station.

19. The method of claim 18, wherein the first NAN channel supports a beaconing operation that provides synchronization for the second NAN channel, and wherein the second NAN channel does not support a beaconing operation.

20. The method of claim 19, wherein the second NAN channel is a NAN data link channel.

21. A first station, comprising:
means for sending a service discovery message over a first neighborhood awareness network (NAN) channel of a NAN network to discover whether one or more stations support an application of interest to the first station, wherein the service discovery message includes information that identifies the application of interest to the first station;
means for receiving, in response to the service discovery message, a service response message over the first NAN channel from a second station that supports the application of interest to the first station, wherein the service response message includes information that identifies a NAN data link network that supports the application of interest to the first station;
means for discovering that the second station supports the application of interest to the first station based on the service response message; and
means for exchanging data related to the application of interest over a second NAN channel of the NAN data link network at a plurality of periodic windows with the second station, wherein synchronization of stations participating in the NAN data link network is unsupported by the second NAN channel, and the second NAN channel relies on the first NAN channel to provide the synchronization of all of the stations participating in the NAN data link network.

22. The first station of claim 21, further comprising:
means for sending an association message over the second NAN channel to the second station within the NAN data link network identified in the service response message.

23. The first station of claim 21, further comprising:
means for sending a peer discovery message over the second NAN channel;
means for receiving, from each station of one or more stations that received the peer discovery message, a respective peer discovery response message; and
means for updating, based on each respective peer discovery response message received from the one or more stations that received the peer discovery message, a neighbor list that identifies one or more stations participating in the NAN data link network.

24. The first station of claim 23, wherein the means for updating is configured to add one or more new stations to the neighbor list, wherein the one or more new stations include the one or more stations from which the first station received each respective peer discovery response message, and wherein the first station further comprises:
means for sending an association message over the second NAN channel to at least one of the one or more new stations.

25. The first station of claim 21, further comprising:
means for receiving, from a third station, a service advertisement broadcast message over the first NAN channel, the service advertisement broadcast message including information that identifies the application of interest to the first station and a NAN data link network that supports the application of interest to the first station; and
means for sending a peer discovery message over the first NAN channel, the peer discovery message including information corresponding to the application of interest to the first station and the NAN data link network that supports the application of interest to the first station.

26. The first station of claim 25, wherein the means for sending the peer discovery message is configured to send the peer discovery message during a discovery window of the first NAN channel during which a plurality of neighborhood stations participating in the NAN data link network are awake.

27. The first station of claim 25, further comprising:
means for receiving an association message over the second NAN channel from one or more stations that received the peer discovery message.

28. The first station of claim 27, wherein the means for receiving the association message is configured to receive the association message during a paging window of the second NAN channel during which the first station is awake.

29. The first station of claim 21, further comprising:
means for receiving, from a third station, a service advertisement message over the first NAN channel, the service advertisement message including information that identifies: the application of interest to the first station, a NAN data link network that supports the application of interest to the first station, and a list of neighboring stations.

30. The first station of claim 29, further comprising:
means for sending an association message over the second NAN channel to the third station within the NAN data link network identified in the service advertisement message.

31. A first station, comprising:
a memory; and
at least one processor coupled to the memory, wherein the at least one processor is configured to:
send a service discovery message over a first neighborhood awareness network (NAN) channel of a NAN network to discover whether one or more stations support an application of interest to the first station, wherein the service discovery message includes information that identifies the application of interest to the first station;
receive, in response to the service discovery message, a service response message over the first NAN channel from a second station that supports the application of interest to the first station, wherein the service response message includes information that identifies a NAN data link network that supports the application of interest to the first station;
discover that the second station supports the application of interest to the first station based on the service response message; and
exchange data related to the application of interest over a second NAN channel of the NAN data link network at a plurality of periodic windows with the second station, wherein synchronization of stations participating in the NAN data link network is unsupported by the second NAN channel, and the second NAN channel relies on the first NAN channel to provide the synchronization of all of the stations participating in the NAN data link network.

32. A non-transitory computer-readable medium having code stored thereon that, when executed, causes at least one processor of a first station to:
send a service discovery message over a first neighborhood awareness network (NAN) channel of a NAN network to discover whether one or more stations support an application of interest to the first station, wherein the service discovery message includes information that identifies the application of interest to the first station;

receive, in response to the service discovery message, a service response message over the first NAN channel from a second station that supports the application of interest to the first station, wherein the service response message includes information that identifies a NAN data link network that supports the application of interest to the first station;

discover that the second station supports the application of interest to the first station based on the service response message; and exchange data related to the application of interest over a second NAN channel of the NAN data link network at a plurality of periodic windows with the second station, wherein synchronization of stations participating in the NAN data link network is unsupported by the second NAN channel, and the second NAN channel relies on the first NAN channel to provide the synchronization of all of the stations participating in the NAN data link network.

* * * * *